UNITED STATES PATENT OFFICE.

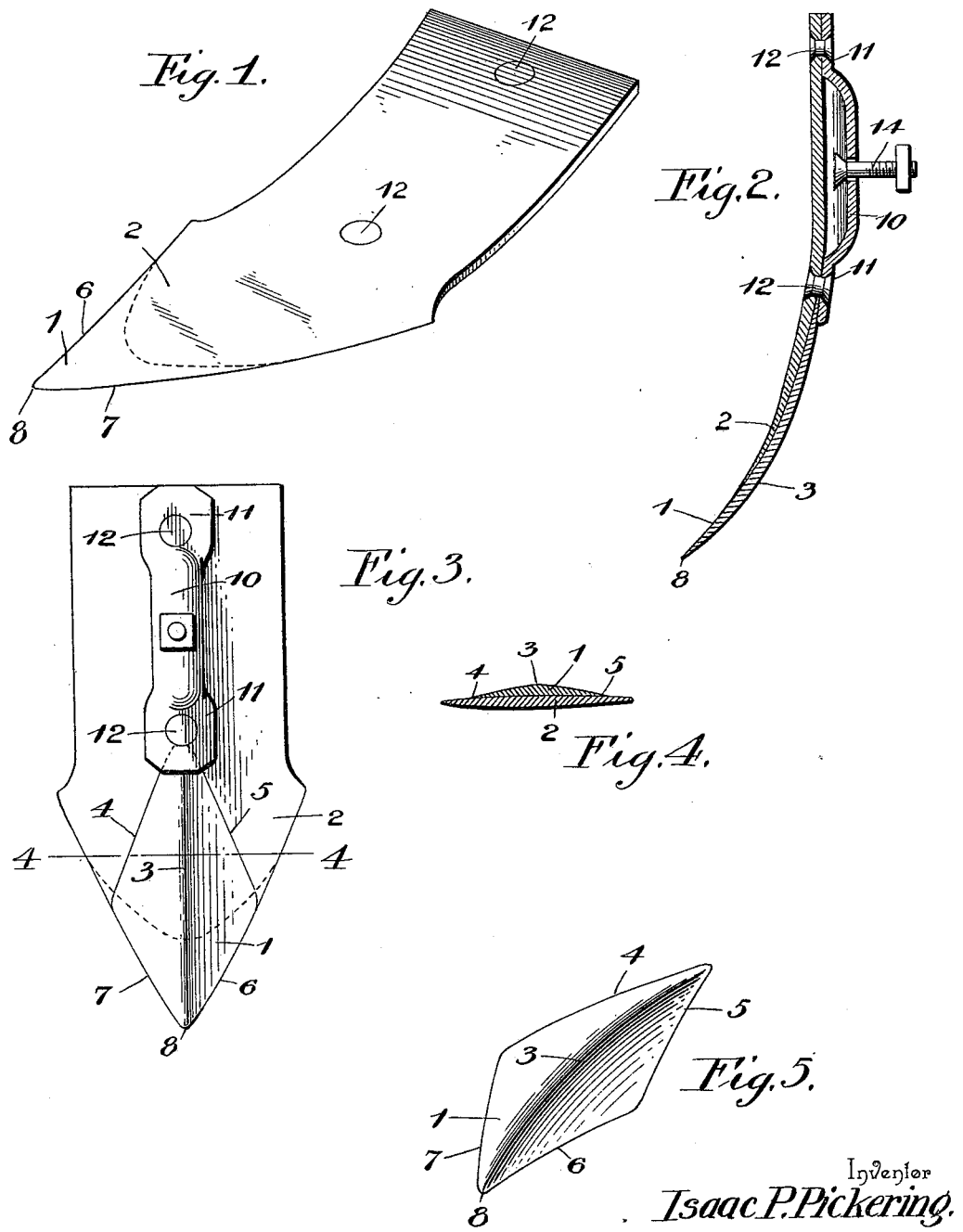

ISAAC P. PICKERING, OF ELWOOD, NEBRASKA.

PLOW-SHOVEL.

SPECIFICATION forming part of Letters Patent No. 613,302, dated November 1, 1898.

Application filed September 15, 1897. Serial No. 651,757. (No model.)

*To all whom it may concern:*

Be it known that I, ISAAC P. PICKERING, a citizen of the United States, residing at Elwood, in the county of Gosper and State of Nebraska, have invented a new and useful Plow-Shovel, of which the following is a specification.

My invention relates to improvements in shovels for cultivators; and the object that I have in view is to provide means whereby the life and durability of the shovel may be greatly prolonged and worn or blunted shovels may be repaired so as to render them equal to new shovels.

A further object of the invention is to provide a peculiarly novel form of attachable point which will add or lend strength to the shovel and the point thereof; and a further object is to provide a simple and durable construction of point which may be applied to any form of worn shovel and which shall be cheap and easy of manufacture.

With these ends in view the invention consists in a cultivator-shovel having a point united solidly thereto by welding the shovel and point together, said point having a longitudinal ridge or rib extending along its medial line from one extremity to the other; and the invention further consists in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view of a cultivator-shovel constructed in accordance with my invention, the dotted lines representing the blunted or worn edge of the shovel. Fig. 2 is a longitudinal sectional view thereof. Fig. 3 is a view of the reverse side of the shovel. Fig. 4 is a transverse sectional view showing the shovel and its point. Fig. 5 is a detail perspective view of the point, which may be welded to the shovel.

Like numerals of reference denote corresponding parts in all the figures of the drawings.

1 designates the point, which may be welded to the shovel 2 for the purpose of repointing the same and making the shovel equal to a new one for all practical purposes.

My improvement is especially designed for repairing shovels which have been used to such an extent as to wear down the working edge of the shovel to a blunt edge. The shovel with this blunt edge is practically unfit for service, because the blunt rounded edge of the shovel does not act efficiently when the implement is in use. Hence the farmer is obliged to replace the blunt shovel with a new set of shovels, which involves considerable expense. The employment of my point enables the worn-out blunt-edged shovel to be repaired at a trifling cost and to be restored to a condition as good as new.

In the practical manufacture of the point for repointing worn-out shovels I make the point of steel and in the diamond shape shown by Fig. 5. This diamond-shaped point has a reinforcing rib or fin 3, which is formed as an integral part of the point and which extends along the medial line of the point in the direction of the greatest length or major axis of said point. This rib or fin is provided on the back or neutral face of the point by forcing the metal from the side edges of the point inward to the medial line during the fabrication of the metal and the operation of welding the point to the shovel, and this longitudinal rib or fin not only imparts stiffness and rigidity to the point, but it also imparts strength to the shovel which is repaired by welding the point to the shovel. From the thickened longitudinal center of the point formed by the rib or fin thereof the metal forming the point tapers toward the side edges of the point. That half of the point which is to be welded to the worn-out shovel has its edges 4 5 tapered to a feather-edge or an extremely thin edge. This is important, as the upper half of the point may be applied and welded to the shovel to the best advantage and to present a neat appearance and a smooth surface.

In Figs. 1 and 3 of the drawings I have shown my improved point 1 applied and united to a shovel 2, and in these figures the dotted lines represent the rounded and blunt edge which is formed on the shovel 2 after the latter has been in service for some time. In applying my improved point to such a shovel as is represented by the numeral 2 in the drawings I fit the upper half of the diamond-shaped point 1 to the rear face or side of the shovel, so that the edges 4 5 of the point apply or fit properly against the rear side of the shovel, said point being intimately and solidly united to the shovel by welding the same thereto. The lower half of the diamond-shaped point extends or protrudes beyond the rounded blunt edge of the shovel, and the edges 6 and 7 of the point are beveled to form the cutting edges at the sides, which diverge from the entrance extremity 8 of the point 1 to the edge of the shovel-blade 2.

From the foregoing description, taken in connection with the drawings, it will be seen that I have provided an improved form of point-blade which is very simple and cheap in construction and which may be easily united at a trifling cost to a worn-out or blunt-edged shovel to render the same as good as a new shovel-blade.

In some cases my improved point-blade may be used in connection with the casting 10 on the rear face of the shovel 2. This casting is provided with flattened ends 11, which are arranged laterally against the rear face of the shovel and are united to the same by means of the rivets 12, which pass through suitable holes in the flattened ends of the casting and the shovel, the outer extremities of the rivets being headed down flush with the face of the shovel. In using my improved point-blade in connection with shovels equipped with this casting the upper half of the point-blade is united to the shovel in the manner described, and the casting is then applied to the shovel to have one flattened end of the casting fit or lap over the upper extremity of the point-blade, after which the casting is riveted in place. This construction and arrangement of parts reinforces the connection of the point-blade with the shovel and provides an exceedingly strong and durable shovel with a new point which protrudes beyond the rounded blunt edge of the shovel. The casting 10 has an aperture, through which passes a bolt 14, that serves as a means for the attachment of the shovel to the stock or foot of the cultivator implement.

One of the important features of my improvement is the provision of the longitudinal rib or fin on the rear side of the point-blade. This rib or fin not only stiffens and adds rigidity to the point-blade, but when the latter is welded to the shovel the rib or fin strengthens the shovel itself.

The point-blade is of steel to enable it to be readily welded to the shovel and for the purpose of tempering it according to the soil in which the implement may be used. Said point-blade is, furthermore, curved to conform to the shape of the shovel. The diamond shape of the point-blade is advantageous in that one half of the blade provides a good broad surface for union with the shovel during the welding operation, while the other half of said point-blade projects from the shovel to present proper working edges to the ground in which the implement is used.

Various slight changes in the form and proportion of parts may be made without departing from the spirit of the invention.

Having thus fully described my invention, what I claim as new, and desire to secure by Letters Patent, is—

1. A shovel consisting of a diamond-shaped point having a longitudinal ridge along its median line and tapered from said median ridge to feather-edges at the sides thereof, said point united at its upper half to the rear side of a blunt-pointed shovel and with its lower half protruding beyond the worn edge of said shovel and with the side edges of the protruding half of the point lying coincident with, and forming continuations of, the corresponding shovel edges, substantially as described.

2. The combination with a blunt-pointed shovel, of a diamond-shaped point united to the rear side of said shovel to have its lower pointed end protrude beyond the worn shovel edge, and a bracket fastened to the shovel with the lower bracket end overlapping the upper end of the point to reinforce the joint between the shovel and point, substantially as described.

In testimony that I claim the foregoing as my own I have hereto affixed my signature in the presence of two witnesses.

ISAAC P. PICKERING.

Witnesses:
W. L. TILDEN,
J. G. PACE.